United States Patent
Hundemer

(10) Patent No.: US 10,083,414 B1
(45) Date of Patent: Sep. 25, 2018

(54) NEWS PRODUCTION SYSTEM WITH DEVICE CONTROL USING MULTIPLE PROTOCOLS

(71) Applicant: Tribune Broadcasting Company, LLC, Chicago, IL (US)

(72) Inventor: Hank J. Hundemer, Bellevue, KY (US)

(73) Assignee: Tribune Broadcasting Company, LLC, Chicago, IL (US)

( * ) Notice: Subject to any disclaimer, the term of this patent is extended or adjusted under 35 U.S.C. 154(b) by 829 days.

(21) Appl. No.: 14/628,771

(22) Filed: Feb. 23, 2015

Related U.S. Application Data

(60) Provisional application No. 61/973,725, filed on Apr. 1, 2014.

(51) Int. Cl.
| | |
|---|---|
| *G06Q 10/06* | (2012.01) |
| *H04N 21/81* | (2011.01) |
| *H04N 21/262* | (2011.01) |

(52) U.S. Cl.
CPC ... *G06Q 10/06316* (2013.01); *G06Q 10/0631* (2013.01); *H04N 21/26241* (2013.01); *H04N 21/26258* (2013.01); *H04N 21/8126* (2013.01)

(58) Field of Classification Search
None
See application file for complete search history.

(56) References Cited

U.S. PATENT DOCUMENTS

| | | | | |
|---|---|---|---|---|
| 6,141,007 | A * | 10/2000 | Lebling | G06F 17/30716 707/E17.093 |
| 6,597,376 | B1 * | 7/2003 | Windrem | H04N 5/265 348/E5.056 |
| 8,850,319 | B2 * | 9/2014 | Stoen | H04L 12/581 715/704 |
| 8,988,611 | B1 * | 3/2015 | Terry | H04N 5/2224 348/722 |
| 2007/0011710 | A1 * | 1/2007 | Chiu | H04L 51/04 725/95 |
| 2009/0319574 | A1 * | 12/2009 | Burgard | H04H 20/82 |
| 2012/0236160 | A1 * | 9/2012 | Rezek | H04N 5/222 348/207.11 |

* cited by examiner

*Primary Examiner* — Thomas L Mansfield
(74) *Attorney, Agent, or Firm* — McDonnell Boehnen Hulbert & Berghoff LLP

(57) ABSTRACT

An example news production system includes a scheduling system and multiple remotely controllable devices configured to perform actions based on commands. A first remotely controllable device is configured to receive commands formatted according to a first protocol, and a second remotely controllable device is configured to receive commands formatted according to a second protocol. The scheduling system accesses a news program schedule that specifies a sequence of actions to be performed by the news production system. The scheduling system access the schedule, selects entries from the news program schedule, generates commands based on the selected entries for the first and second remotely controllable devices in accordance with the first and second protocols, respectively, and transmits the generated commands to the first and second remotely controllable devices.

20 Claims, 3 Drawing Sheets

NEWS PRODUCTION SYSTEM WITH DEVICE CONTROL USING MULTIPLE PROTOCOLS

CROSS-REFERENCE TO RELATED APPLICATIONS

This application claims priority to U.S. Provisional Patent Application No. 61/973,725, filed Apr. 1, 2014, which is incorporated herein by reference in its entirety and for all purposes.

USAGE AND TERMINOLOGY

Throughout this application, with respect to all reasonable derivatives of such terms, and unless otherwise specified (and/or unless the particular context clearly dictates otherwise), each usage of:

"a" or "an" means at least one.
"the" means the at least one.
"video" means any material represented in a video format (i.e., having multiple frames). In some instances, video may include multiple sequential frames that are identical or nearly identical, and that may give the impression of a still image. Video may or may not include an audio portion.
"clip" means a portion of video.
"player" means a video player.

TECHNICAL FIELD

The disclosed system and method relate generally to sequencing and scheduling events in connection with a news production system.

BACKGROUND

Unless otherwise indicated herein, the materials described in this section are not prior art to the claims in this disclosure and are not admitted to be prior art by inclusion in this section.

A news production system (NPS) may facilitate the production of a news program for television broadcast, or other broadcast. In this context, the NPS may produce a news program in accordance with a news program schedule (sometimes called a "rundown"), which specifies an order of events related to the production of the news program. For instance, a news program schedule may indicate that various clips are to be loaded and played out by a player in a particular order so that the clips may be part of the news program.

The news program schedule may indicate events in which video is captured via a camera on a news set. Such video capture events may include capturing video of a news anchor (or another individual such as a reporter, correspondent, actor, or news personality) discussing news stories. The news program schedule may optionally include indications of the description presented by the news anchor. For example, the news program schedule may interface with a teleprompter to populate the teleprompter viewer with a script to be read by the news anchor.

The news program schedule may also indicate settings and orientations for lighting equipment, camera(s), and certain other remotely controllable equipment involved with production of a news program. In conventional systems, such remotely controllable equipment is configured to operate in response to receiving command signals formatted according a particular communication protocol known as the media object server (MOS) protocol. The MOS protocol was developed for NPSs to provide a common interface for communication between NPS equipment from different manufacturers.

SUMMARY

In one aspect, a news production system (NPS) is disclosed. The NPS can include a first remotely controllable device, a second remotely controllable device, and a scheduling system. The first remotely controllable device can be configured to perform an action from a first set of actions in response to receiving a corresponding command from a first set of commands. The first set of commands can be formatted according to a first protocol. The second remotely controllable device can be configured to perform an action from a second set of actions in response to receiving a corresponding command from a second set of commands. The second set of commands can be formatted according to a second protocol different from the first protocol. The scheduling system can be configured for: (i) accessing a news program schedule including entries indicative of a sequence of events to be carried out using the NPS, (ii) selecting a first entry from the accessed news program schedule, (iii) making a first determination that the selected first entry is associated with a first action to be performed by the first remotely controllable device, (iv) responsive to making the first determination, generating a first command that is in accordance with the first protocol and that corresponds to the first action, (v) transmitting the generated first command to the first remotely controllable device and thereby causing the first remotely controllable device to perform the first action, (vi) selecting a second entry from the accessed news program schedule, (vii) making a second determination that the selected second entry is associated with a second action to be performed by the second remotely controllable device, (viii) responsive to making the second determination, generating a second command that is in accordance with the second protocol and that corresponds to the second action, and (ix) transmitting the generated second command to the second remotely controllable device and thereby causing the second remotely controllable device to perform the second action.

In another aspect, an example method for use in an NPS including a first remotely controllable device, a second remotely controllable device, and a scheduling system is disclosed. The first remotely controllable device can be configured to perform an action from a first set of actions in response to receiving a corresponding command from a first set of commands. The first set of commands can be formatted according to a first protocol. The second remotely controllable device can be configured to perform an action from a second set of actions in response to receiving a corresponding command from a second set of commands. The second set of commands can be formatted according to a second protocol different from the first protocol. The method can include accessing, via the scheduling system, a news program schedule including entries indicative of a sequence of events to be carried out using the NPS. The method can include selecting a first entry from the accessed news program schedule. The method can include making a first determination that the selected first entry is associated with a first action to be performed by the first remotely controllable device. The method can include generating a first command that is in accordance with the first protocol and that corresponds to the first action responsive to making the first determination. The method can include transmitting the generated first command to the first remotely controllable device and thereby causing the first remotely controllable device to perform the first action. The method can include selecting a second entry from the accessed news program schedule. The method can include making a second determination that the selected second entry is associated with a second action to be performed by the second remotely controllable device. The method can include generating a second command that is in accordance with the second protocol and that corresponds to the second action responsive to making the second determination. The method can include transmitting the generated second command to the second remotely controllable device and thereby causing the second remotely controllable device to perform the second action.

In yet another aspect, an example non-transitory computer-readable medium storing instructions that, when executed by one or more processors of a computing system associated with an NPS, cause performance of operations is disclosed. The NPS can include a first remotely controllable device configured to perform an action from a first set of actions in response to receiving a corresponding command from a first set of commands. The first set of commands can be formatted according to a first protocol. The NPS can include a second remotely controllable device configured to perform an action from a second set of actions in response to receiving a corresponding command from a second set of commands. The second set of commands can be formatted according to a second protocol different from the first protocol. The operations can include accessing a news program schedule including entries indicative of a sequence of events to be carried out using the NPS. The operations can include selecting a first entry from the accessed news program schedule. The operations can include making a first determination that the selected first entry is associated with a first action to be performed by the first remotely controllable device. The operations can include generating a first command that is in accordance with the first protocol and that corresponds to the first action responsive to making the first determination. The operations can include transmitting the generated first command to the first remotely controllable device and thereby causing the first remotely controllable device to perform the first action. The operations can include selecting a second entry from the accessed news program schedule. The operations can include making a second determination that the selected second entry is associated with a second action to be performed by the second remotely controllable device. The operations can include generating a second command that is in accordance with the second protocol and that corresponds to the second action responsive to making the second determination. The operations can include transmitting the generated second command to the second remotely controllable device and thereby causing the second remotely controllable device to perform the second action.

These as well as other aspects, advantages, and alternatives, will become apparent to those of ordinary skill in the art by reading the following detailed description, with reference where appropriate to the accompanying drawings.

DETAILED DESCRIPTION OF THE DRAWINGS

I. Overview

Figure 1A:
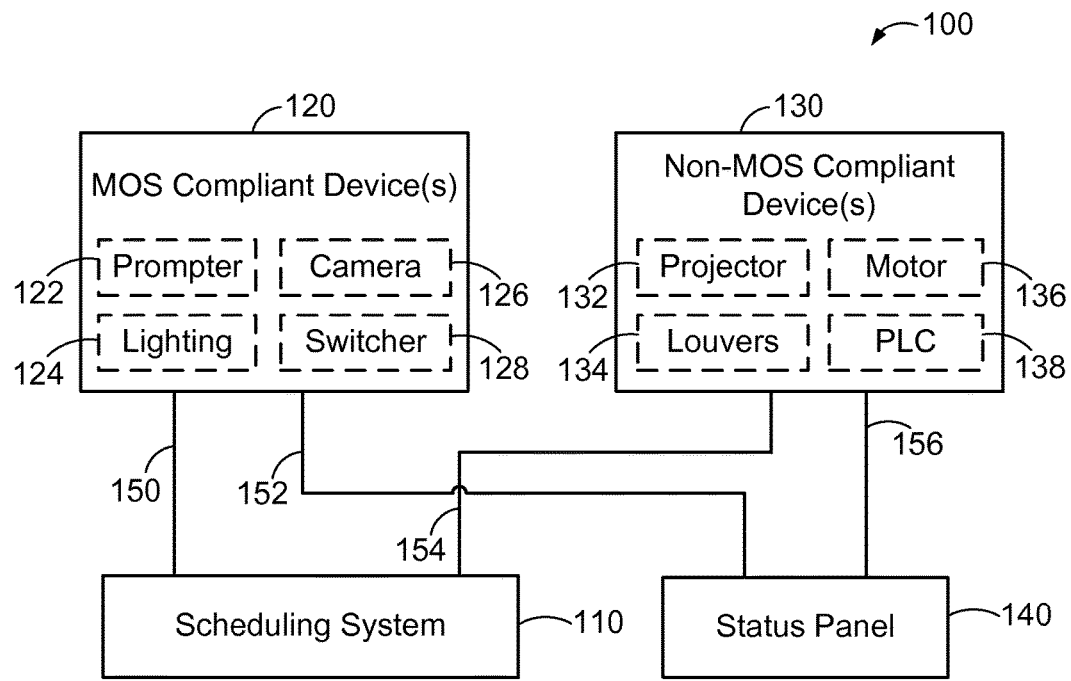
FIG. 1A is a simplified diagram of an example NPS.

An example NPS includes a number of devices that can be remotely controlled to perform actions in accordance with a predetermined sequence of events specified by a news program schedule. For instance, the NPS may include a camera that captures video of a news set for incorporation in a broadcast video stream. Equipment of the news set may be remotely controllable to perform actions specified by the schedule, such as a lighting system that illuminates the news set, a camera that captures video of the news set, and/or a teleprompter that provides text for a news anchor to read aloud.

Additionally, equipment of the NPS involved with routing video to a broadcast system may be remotely controllable to perform actions specified by the schedule, such as a media server that plays out stored video clips to be incorporated into the broadcast video stream, a router that directs video streams from different sources, and/or a production switcher that outputs video to a broadcast system and/or incorporates various digital video effects (DVEs) in the output video.

As indicated above, conventional remotely controllable video processing and news set equipment is configured to receive commands formatted according to the MOS protocol. By adopting a single communication protocol, remotely controllable equipment from different manufacturers can be incorporated into a single news room scheduling system that operates in accordance with that protocol.

Given this, remotely controllable equipment configured for use in an NPS is distinguished from generic remotely controllable equipment, because such NPS equipment is configured to operate in compliance with the MOS protocol. Incorporating other types of remotely controllable equipment (i.e., non-MOS-compliant devices) into an NPS has conventionally been done by including a second scheduling system that controls such non-MOS-compliant devices. Human operators would then work together to coordinate the operations of MOS-compliant devices and the non-MOS-compliant devices. For example, two people operating two separate control panels may provide user inputs to synchronize certain events performed by the two separate sets of devices (e.g., by pressing buttons at or near the same instant).

Additionally, some remotely controllable devices which may, at least in principle, be useful in an NPS have simply not been employed in the news production domain because of the difficulties and expense in working around the barriers of non-MOS-compliant communication protocols. For instance, it may be desired to have a given NPS incorporate a feature in which a display panel is moved from one position to another position, or in which a louver system functions to adjust an amount of ambient light at an appropriate time. However, remotely controllable devices for performing these functions (e.g., robotic control arms, motors, programmable logic controllers, robotic louver systems) may not be configured for communicating using the MOS protocol. Thus, incorporating such features into an NPS may be overly burdensome and/or expensive, particularly if the other equipment in the NPS is MOS-compliant, and so introducing non-MOS-compliant devices may require a second scheduling and control system.

The present disclosure helps address this issue by providing an NPS with a scheduling system configured to generate commands to both MOS-compliant and non-MOS-compliant remotely controllable devices, thereby allowing for the incorporation of both sets of devices into the single news program schedule. To cause a given non-MOS-compliant device to perform a given action, in one example an entry in the news program schedule includes attributes that refer to both the device and to the action to be performed by that device. The scheduling system includes logic that interprets the entry and generates suitable commands that correspond to the given action and that are formatted according to a protocol understood by the given device. When traversing the news program schedule, the scheduling system selects each entry in turn and provides information corresponding to the selected entry to the remotely controllable equipment included in the NPS, and thereby causes the equipment to perform the actions specified by the news program schedule.

In some examples, the scheduling system may generate non-MOS commands by invoking a device-specific subroutine that functions to map an attribute included in an entry of the news program schedule to a command formatted in accordance with a protocol suitable for the specific device. For example, a subroutine may be provided for a remotely controllable motor, which is configured to operate in accordance with commands transmitted over an internet protocol (IP) channel. The subroutine may be configured to generate a number of different hex code commands over the IP channel by mapping arguments passed to the subroutine to predetermined hex code command(s), which cause the motor to perform desired action(s). In practice, the news program schedule can thereby include an entry which refers to a particular device (e.g., by identifying a particular device-specific subroutine), and which refers to an action to be performed by that device (e.g., a text string that can be interpreted by the subroutine to generate a corresponding command (or set of commands) according to a protocol appropriate for the particular device, and that causes the device to perform the action specified. The commands generated by each device-specific subroutine may be determined based on an initial calibration process or the like such that particular predetermined functions performed by the non-MOS-compliant device each correspond to a particular attribute that can be included in the news program schedule.

By generating commands within device-specific subroutines, the details of the particular protocols used by various non-MOS-compliant devices can be removed from the news program schedule, and instead predetermined functions can be referred to in an abstract manner by the news program schedule (e.g., using text strings). The abstract references in the news program schedule can then be used to generate a particular command suitable for the device to be controlled using the device-specific subroutine. Among other things, such abstract references allow the news program schedule to be more readily interpreted and/or manipulated by users of the NPS.

Embodiments described herein thus help to facilitate at least partial regulation/control of both MOS-compliant devices and non-MOS-compliant devices by a single NPS scheduling system in accordance with entries in a single news program schedule. The presently disclosed NPS thereby provides for a system in which a MOS-compliant device can perform an action specified by an entry in the news program schedule, and a non-MOS-compliant device can perform an action specified by an entry in the same news program schedule. In addition, the presently disclosed NPS allows for non-MOS-compliant devices to be more integrated into the automated regulation/control of the NPS scheduling system.

During production of a news program, the scheduling system and/or other NPS sub-systems can access news program schedule entries, identify attributes in each entry, and determine actions to be performed based on the identified attributes. In practice, the entries correspond to actions to be performed by particular remotely controllable devices. In circumstances in which the remotely controllable device is not MOS-compliant, the scheduling system can generate appropriate commands formatted according to the protocol used by the device. Thus, the various sub-systems and components in the NPS function to carry out actions based on the news program schedule entries.

In some cases, a user interface is also provided to facilitate timing and/or synchronization of certain actions—such as to allow a producer to initiate the performance of one or more actions that various NPS systems perform on the basis of news program schedule entries. The user interface can thereby allow for some degree of manual control over aspects such as timing even as individual components in the NPS system dynamically configure themselves (without user input) to perform the functions specified by news program schedule entries.

II. Example NPS

FIG. 1A is a simplified block diagram of an example news production system (NPS) 100. The NPS 100 may be configured to perform a variety of functions related to producing a news program. The NPS may output the news program in video form, which in turn may be sent to a television-broadcasting system for broadcast. It is understood that the video output from the NPS 100 may be subjected to additional processing before being broadcast. For example, the video may be modified with a digital video effect (DVE) before being broadcast. Moreover, it is understood that the term "broadcast" may include a variety of systems for distributing video content, including, without limitation, over the air broadcast channels, and digital video streaming services (e.g., via the Internet).

The NPS 100 may include one or more devices, including for example a scheduling system 110, one or more MOS-compliant devices 120, one or more non-MOS-compliant devices 130, and a status panel 140. Among other examples, the MOS-compliant devices 120 may include one or more of a teleprompter 122, a lighting system 124, a robotic camera system 126, and a production switcher 128; and the non-MOS-compliant devices 130 may include one or more of a projector 132, a robotic louver system 134, a motor 136, and programmable logic controller (PLC) 138. The systems and devices in the NPS 100 are configured to communicate between one or more others of the devices so as to cause the NPS 100 to carry out the functions described herein. Note that the NPS 100 need not include all of these devices and it may include additional devices.

The devices in the NPS 100 described herein may communicate with each other and/or with external devices via one or more communication paths. Generally, the communication paths between devices may be provided via wired and/or wireless communication in accordance with one or more communication protocols as necessary to achieve desired performance characteristics (e.g., bandwidth, latency, reliability). These devices may communicate with each other and/or with external devices according to one or more protocols. For example, the MOS-compliant devices 120 may communicate in accordance with one or more versions of the MOS protocol. And the non-MOS-compliant devices 130 may communicate in accordance with another communication protocol that is not the MOS protocol. Further, individual ones of the non-MOS-compliant devices 130 may communicate using different communication protocols. For instance, a first one of the non-MOS-compliant devices 130 may receive commands over an IP channel using communications formatted in accordance with the transmission control protocol (TCP), and a second one of the non-MOS-compliant devices 130 may receive commands over an IP channel using communications formatted in accordance with the user datagram protocol (UDP).

As shown in FIG. 1A, the scheduling system 110 and the MOS-compliant devices 120 may communicate via path 150, and the scheduling system 110 and the non-MOS-compliant devices 130 may communicate via path 154. Further, the MOS-compliant devices 120 and the status panel 140 may communicate via path 152, and the status panel 140 and the non-MOS-compliant devices 130 may communicate via path 156. It is understood that the path 150 for communications between the scheduling system 110 and the MOS-compliant devices 150 may include multiple individual paths that couple each of the individual MOS-compliant devices (e.g., the prompter 122, lighting system 124, robotic camera system 126, and production switcher 128) to the scheduling system 110. Similarly, it is understood that the paths 152 may include multiple individual paths that couple each of the individual MOS-compliant devices 120 to the status panel 140. And the paths 154 and 156 may include multiple paths that couple each of the individual non-MOS-compliant devices 130 with the scheduling system 110 and the status panel 140, respectively.

A. Scheduling System

The scheduling system 110 is configured to perform functions related to scheduling and managing the production of a news program. For example, the scheduling system 110 may be configured to read a news program schedule (e.g., data that specifies an order and/or schedule of events, such as actions performed by remotely controllable devices). The scheduling system 110 may include a user interface to allow a user to generate the news program schedule. Once generated, the scheduling system 110 may make the news program schedule available to be accessed by other components in the NPS 100. The NPS components can then access entries in the news program schedule, select an entry, read data associated with the entry, and determine actions to perform based on attributes in the entries (i.e., in the received data). As a result, the various components in the NPS 100 perform various actions corresponding to each entry in the sequence indicated by the news program schedule. In some cases, the timing of each event may further be controlled, at least in part, by the scheduling system 110 (e.g., by specifying a particular number of seconds or frame times, or another measure of time between distinct events) or perhaps a user input may indicate a start time for one or more events (e.g., to facilitate timing control by a producer or other individual).

The scheduling system 110 may be alternately referred to herein as a "sequencing system" to reflect its role in setting the sequence of various events, but not necessarily the timing of those events, which may be based on an external input (e.g., a user input). Functionality of the scheduling system 110 to effect automated control of the NPS 100 (e.g., in accordance with a predetermined scripted sequence) is described further herein in terms of functional modules.

Figure 1B:
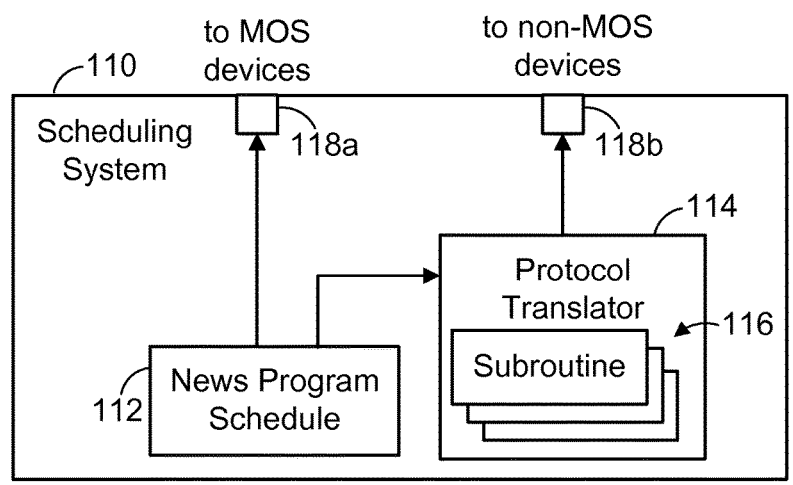
FIG. 1B is a simplified diagram of an example scheduling system.

FIG. 1B is a simplified block diagram of the scheduling system 110 which illustrates functional modules of the scheduling system 110. It is understood that the various functional modules may be implemented by hardware, firmware, and/or software aspects, and may be combined in a variety of different ways. The scheduling system 110 can include a news program schedule module 112, a protocol translator module 114, and communication channels 118a, 118b. The communication channel 118a can be used to communicate with the MOS-compliant devices 120 (via path 150), and the communication channel 118b can be used to communicate with the non-MOS-compliant devices 130 (via path 154). In some examples, the communication channels 118a, 118b may be implemented by distinct ports of an Ethernet connection.

The news program schedule module 112 can traverse a news program schedule, select individual entries, and provide information indicative of actions to be performed by particular remotely controllable devices to those devices. In some examples, the news program schedule module 112 may be implemented, at least in part, by functional modules within the individual remotely controllable devices (e.g., the MOS-compliant devices 120). For example, the MOS-compliant devices 120 may access the news program schedule via the communication path 150 and read data associated with the individual entries so as to make determinations involving actions to be performed by those devices.

The protocol translator module 114 is used to generate commands to the non-MOS-compliant devices based on entries in the news program schedule. The news program schedule module 112 communicates with the protocol translator module 114, and upon the news program schedule module 112 selecting an entry that refers to a non-MOS-compliant device, the news program schedule module 112 prompts the protocol translator module 114 to generate a suitable command to that device. For example, the news program schedule module 112 may send a communication to the protocol translator 114 indicating the particular non-MOS-device and the action to be performed by that device. The protocol translator module 114 can select a particular device-specific subroutine from amongst a set of predefined subroutines 116. For instance, the set of predefined subroutines 116 may include one subroutine for each of the non-MOS-compliant devices 130 in the NPS 100, and the protocol translator 114 can select the one subroutine that corresponds to the device indicated by the news program schedule. The protocol translator 114 can then use the selected subroutine to generate a command that is formatted in accordance with the protocol suitable for the device. Once generated, the command can be sent to the non-MOS-compliant device using communication channel 118b.

B. MOS-Compliant Devices

The MOS-compliant devices 120 may include a variety of different remotely controllable devices configured to communicate using the MOS protocol. Such devices may include, for example, the teleprompter 122, the lighting system 124, the robotic camera system 126, and the production switcher 128. Other examples of remotely controllable MOS-compliant devices are also possible. The individual devices communicate with the scheduling system 110 via path 150 to access entries in the news program schedule and perform actions corresponding to those entries.

For example, the teleprompter 122 may display text to be read aloud by a news anchor in response to accessing a news program schedule entry that corresponds to that action. In another example, the lighting system 124 may assume a specified configuration and illuminate a news set in a specified manner in response to accessing a corresponding news program schedule entry (e.g., the entry may specify a brightness level, orientation of the lighting system mount). In another example, the robotic camera system 126 may position the camera to capture video of the news set in a specified manner in response to accessing a corresponding news program schedule entry (e.g., the entry may specify an orientation of the camera. In another example, the production switcher 128 may use a specified incoming video stream (or streams) to generate an output video stream for broadcast and/or apply a specified DVE in response to accessing a corresponding news program schedule entry. Other examples are also possible.

C. Non-MOS-Compliant Devices

The non-MOS-compliant devices 130 may include a variety of different remotely controllable devices configured to communicate using communication protocols that are different from the MOS protocol. Example protocols may include, without limitation, UDP or TCP formatted communications transmitted over an IP channel. In some examples, the non-MOS-compliant devices may be configured to receive commands formatted as hex codes and to perform predetermined actions in response to receiving such commands. Such devices may include, for example, the projector 132, the robotic louver system 134, the motor 136, and the PLC 138. Other examples of remotely controllable non-MOS-compliant devices are also possible. The individual devices communicate with the scheduling system 110 via path 154 to receive commands corresponding to entries in the news program schedule and perform specified by those entries.

For example, the projector 132 may be turned on and turned off by commands communicated via channel 154. The projector 132 may be incorporated into a news set as a visual aid to project graphics and other content while the news set is arranged in a particular configuration (e.g., a "sports" configuration). The scheduling system 110 can then be used to ensure the projector 132 is turned on (and turned off) when the news set is first arranged in the particular configuration (and upon completing use in the particular configuration). In practice, an entry can be included in the news program schedule to cause the protocol translator module 114 to generate a suitable command to turn on the projector 132 during arrangement of the news set in the particular configuration, and another entry can be included to cause the protocol translator module 114 to generate a suitable command to turn off the projector 132 upon completing use in the particular configuration.

In another example, the robotic louver system 134 may be operated to control the amount of ambient light in the environment of a news set. For example, in a news set environment that includes a window or skylight, the robotic louver system can be installed along the window to regulate the natural light that reaches the indoor environment. One of the subroutines 116 can define particular commands formatted for the robotic louver system 134, such as a command to open the louvers, and a command to close the louvers. Entries can then be included in the news program schedule to cause the protocol translator module 114 to generate those commands so as to adjust the ambient light level on the news set.

As such, the robotic louver system 134 may be operated in coordination with other actions performed by the NPS. In some examples, the robotic louver system 134 may be opened to portray an outdoor scene as a backdrop to a news anchor during a particular news segment, and then the robotic louver system 134 may be closed upon completing that segment. In addition, the scheduling system 110 may be used to adjust the brightness of a lighting system (e.g., the lighting system 124) to partially compensate for changes in the amount of ambient light due to opening/closing the robotic louver system 134.

In another example, the motor 136 may be operated to move one or more components from one position to another. For example, a display panel may be included in a news set as a visual aid when the news set is arranged in a particular configuration. To selectively include such a display panel in the news set (i.e., within a field of view of a camera capturing the news set), the display panel may be lowered into place when needed, and raised out of view when not needed. The display panel may be mounted to an assembly which is suspended in a manner that allows the assembly to be raised/lowered by operation of the motor 136 (e.g., by coiling/uncoiling a cable coupled to the assembly). One of the subroutines 116 can define particular commands formatted for operating the motor 136, such as a command to rotate a particular number of steps in a first direction so as to raise the display panel, and a command to rotate a particular number of steps in another direction so as to lower the display panel. Of course, other examples are also possible in which predetermined commands can be used to cause a motor coupled to one or more components in the NPS to effect movement of those components so as to achieve a desired configuration of the news set. Thus, the scheduling system 110 may be used to arrange a component in the news set (e.g., a display panel) by including an entry in the news program schedule that causes the protocol translator 114 to generate a suitable command to the motor 136.

In addition, in some cases, the motor 136 may include (or be associated with) an encoder which indicates a position of the motor (e.g., by a sensor that generates pulses as teeth in a gear pass the sensor position). The encoder can provide feedback to the device-specific subroutine (i.e., one of the subroutines 116), which interprets the feedback signal and causes the motor 136 to rotate until the motor reaches a predetermined position defined by the subroutine. The subroutine can define respective positions that correspond to respective actions performed using the motor 136.

In another example, a PLC 138 may be operated to regulate one or more components in the NPS 100 based on commands provided by the scheduling system 110 (e.g., via the protocol translator 114). One of the subroutines 116 can define commands formatted for the PLC 138, such as commands to regulate one or more additional components or processes (e.g., a control arm, sensors, other electronic components). Thus, the scheduling system 110 may be used to activate the PLC 138, which can then be used to regulate one or more additional components to perform predefined actions indicated by entries in the news program schedule. In practice, the news program schedule can include an entry which indicates the PLC 138 and an action to be performed using the PLC 138. That entry can then cause the protocol translator 114 to generate a suitable command to the PLC 138.

Other examples of non-MOS-compliant devices are also possible. Indeed, nearly any device that is susceptible to performing predetermined actions in response to received commands may be incorporated into an NPS by configuring the protocol translator 114 to generate those commands in response to entries in the news program schedule. For example, while the robotic camera system 126 described above may be a MOS-compliant device that robotically controls the orientation of a video camera, in some cases various settings of the camera itself may be directly controlled (e.g., to turn on and off, adjust tilt/zoom, exposure settings, dynamic range, etc.) by predetermined commands generated via the protocol translator 114 in response to corresponding entries in the news program schedule.

D. Status Panel

The status panel 140 includes a user interface that allows an operator (e.g., a producer, an engineer, or another person) to ascertain the status of the various components in the NPS 100. For example, the status panel 140 may include a number of lights (or other indicators) which indicate a given device's status based on color. In some cases, the status panel 140 may be implemented by an electronic display panel that displays information indicative of the status of the various components. In addition, the user interface of the status panel 140 may indicate error conditions or other warnings from the various components of the NPS 100. For example, components which are reporting an error condition may be displayed by representing those components with a different color than components in a non-error condition. Such status indicators may be based on information communicated form the various remotely controllable devices via paths 152 and 156. For example, the MOS-compliant devices 120 may intermittently provide data indicative of their current status via path 152, and the status panel 140 can then use the provided data to update the user interface such that the producer is informed as to the real time status of those devices.

In addition, the non-MOS-compliant devices 130 may intermittently provide data indicative of their current status via path 156. In some examples, such status report data from the non-MOS-compliant devices may not be formatted in a protocol suitable for communication with the status panel 140. As such, a protocol translator module can interpret the status messages from the non-MOS-compliant devices and generate suitable commands for updating the status panel 140 such that the status panel reflects the real time status of the non-MOS-compliant devices 130 as well as the MOS-compliant devices 120. For example, a protocol translator module may be associated with a buffer memory, and the non-MOS-compliant devices 130 can report status data via a channel addressed to that buffer memory. Upon the protocol translator module detecting data written to the buffer memory, the protocol translator can read the data and select a script corresponding to the device that provided the data. The device-specific script can then be used to read out the data in the buffer, and map the data to a suitable command that can be received by the status panel 140. The protocol translation of status information from the non-MOS-devices 130 to the status panel 140 thereby allows an operator to efficiently identify the current status of all remotely controllable devices in the NPS 100 using the single status panel 140, and to take actions as necessary to address any devices that are encountering an error condition.

E. Example NPS Device

Figure 2:
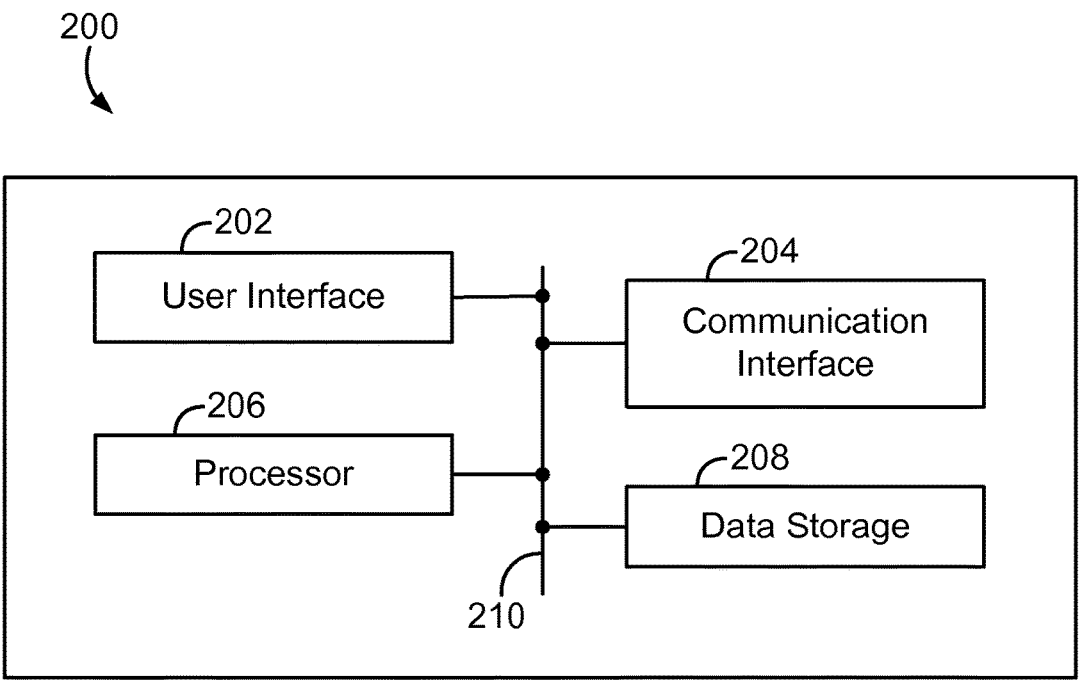
FIG. 2 is a simplified diagram of an example device of the NPS of FIG. 1A.

FIG. 2 is a simplified block diagram of a device 200. The device 200 may take a variety of forms, including for example the scheduling system 110, one of the MOS-compliant devices 120, one of the non-MOS-compliant devices 130, and/or the status panel 140.

The device 200 may include various components, including for example, a user interface 202, a communication interface 204, a processor 206, and a data storage 208, all of which may be electronically connected to each other via a system bus or other connection mechanism 210. Note that the device 200 need not include all of these components and it may include additional components.

The user interface 202 may function to allow the device 200 to interact with a user, such as to receive input from a user and to provide output to the user. Thus, the user interface 202 may include input components such as a computer mouse, a keyboard, or a touch-sensitive panel. The user interface 202 may also include output components such as a display screen (which, for example, may be combined with a touch-sensitive panel) or a speaker. In some cases, the user interface 202 may be used by a producer (or director, or other newsroom personnel) to provide inputs for control of timing or synchronization of certain events performed in accordance with news program schedule entries.

For instance, a producer may monitor events on a news set, such as the readiness of other personnel for certain events to be performed and/or status indicators of various NPS sub-systems (which status indicators may be communicated by the status panel 140 via its user interface). Once the producer judges that the conditions are ready for performance of a next event (or sequence of events) specified by one or more news program schedule entries, the producer can provide an input using the user interface 202 (e.g., by pressing a button). Upon receipt of data indicating the user input, the NPS can then perform the particular event(s). Such user inputs are therefore referred to herein as timing signals or initiation signals. Moreover, in some cases events may be carried out following a predetermined delay after receipt of an initiation signal. Although in other examples, the NPS may perform events without regard to a user input. For instance, the NPS may perform a DVE (via a production switcher) and output resulting video content (or carry out another event) in response to associating a news program schedule entry (or entries) with those events. The time at which the NPS performs those events may be based on a predetermined absolute time (e.g., set by a reference clock that synchronizes NPS sub-systems), or may be based on a predetermined relative delay (e.g., a predetermined delay following execution of another event by the NPS).

The communication interface 204 may function to allow the device 200 to communicate with other devices (e.g., over the paths described above in connection with NPS 100). The communication interface 204 may be configured to transmit and/or receive various types of data, including for example control data or video stream data. In one example, the communication interface 204 may take the form of a wired interface, such as an Ethernet port, USB port, a serial port (e.g., RS232), or HD-SDI port. As another example, the communication interface 204 may take the form of a wireless interface, such as a WiFi interface. In either case, the communication interface 204 may include communication input and/or communication output interfaces.

The processor 206 may include one or more general purpose processors (e.g., microprocessors) and/or one or more special purpose processors (e.g., digital signal processors (DSPs)).

The data storage 208 may include one or more volatile and/or non-volatile storage components, such as magnetic, optical, flash, or organic storage, and may be integrated in whole or in part with the processor 206. The data storage 208 may include removable and/or non-removable components. In some examples, the data storage 208 may include multiple storage drives that store data in a redundant and/or stripped configuration.

Generally, the processor 206 may be configured to execute program instructions (e.g., compiled or non-compiled program logic and/or machine code) stored in the data storage 208 to perform one or more of the functions described herein and/or shown in the accompanying drawings. As such, the data storage 208 may take the form of a non-transitory computer-readable storage medium, having stored thereon program instructions that, upon execution by the processor 206, cause the device 200 to perform one or more of the functions described herein and/or shown in the accompanying drawings.

III. Example News Program Schedule

Figure 3:
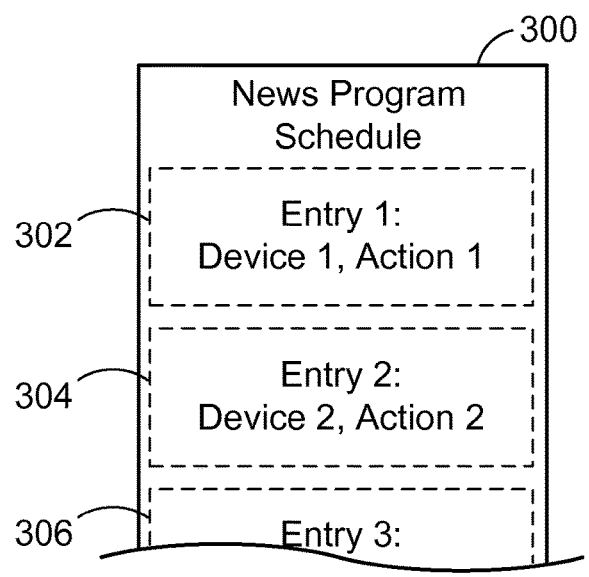
FIG. 3 symbolically illustrates an example news program schedule.

FIG. 3 symbolically illustrates an example news program schedule 300. The example news program schedule 300 includes multiple entries 302, 304, 306. The entries 302, 304, 306 can each indicate actions to be performed by components of the NPS 100. Each entry includes one or more attributes, such as timing information (e.g., to indicate a start time of a particular action), video source information (e.g., a title, a clip identifier, or a player identifier), router instructions (e.g., to map router inputs to router outputs so as to distribute video streams throughout the NPS), DVE information (e.g., indications of DVE(s) to apply to one or more input video streams to generate an output video stream via a production switcher), and production switcher information (e.g., indications of which video stream inputs to use to generate an output video stream), among other attributes. In one example, a user may create the news program schedule 300 via a user interface of a scheduling system (e.g., similar to the scheduling system 110 described in connection with FIG. 1A).

During operation, the entries in the news program schedule 300 can be accessed by a scheduling system and suitable information can then be provided to components in the NPS to cause them to perform actions corresponding to each entry. For example, the first entry 302 can include attributes specifying a first device and a first action to be performed by the first device. Similarly, the second entry 304 can include attributes specifying a second device and a second action to be performed by the second device. As the news program schedule 300 is traversed during a live news program, the devices (e.g., the first device and the second device) can receive information from the scheduling system indicating the actions to be performed by the first device, and second device, respectively.

In some examples, the first device identified by the first entry 302 may be a MOS-compliant device, such as the lighting system 124 described in connection with FIG. 1A, and the second device identified by the second entry 304 may be a non-MOS-compliant device, such as the robotic louver system 134 described in connection with FIG. 1A.

Upon accessing the first entry 302, the scheduling system can identify attributes indicated by the first entry 302. The scheduling system can then send signals to cause the first action to be performed by the first device. For example, signals may be sent to the lighting system 124 to cause the stage lights to orient themselves in a manner specified by the first entry 302 and to illuminate a news set with a brightness specified by the first entry 302. In practice, the NPS may operate by each of the MOS-compliant devices 120 reading data from the news program schedule. A given MOS-compliant device can then identify the entries that specify the given device, and perform those actions at specified times.

Upon accessing the second entry 304, the scheduling system can identify attributes indicated by the second entry 304. The scheduling system can determine that the second entry 304 includes an attribute associated with a non-MOS-compliant device (e.g., the robotic louver system 134) and can use the protocol translator module to generate suitable commands to the non-MOS-compliant device. In practice, the protocol translator module 114 may select a particular device-specific subroutine from amongst a set of predefined subroutines, and then use the selected subroutine and an attribute of the second entry 304 to generate a command formatted in a protocol understood by the second device. The selection of the subroutine may be based on an attribute in the second entry 304 (e.g., the attribute identifying the second device). In some cases, the second entry 304 may include an attribute that identifies the particular subroutine corresponding to the second device. The second entry 304 can also include an attribute that identifies the action to be performed by the second device, and that attribute can be provided to the selected subroutine. The selected subroutine can then generate the command corresponding to that action-indicative attribute based on a predetermined process. For instance, the second entry 304 may cause the robotic louver system 134 to close, and thereby reduce (or otherwise adjust) the amount of ambient light in the environment of the news set.

In some cases, the first and second entries 302, 304 may include timing information to cause the performance of the corresponding actions (adjusting the lighting system 124 and robotic louver system 134) to be performed contemporaneously. In some cases, the initiation of one or both of the actions indicated by the entries 312, 314 may be at least partially based on an external input, such as an input received at a user interface associated with the scheduling system. Upon initiation, the timing information may specify an ordering and/or predetermined delay before starting the next action (e.g., timing information may specify that the second action associated with the second entry 304 commences at the same time the first action associated with the first entry 302 is initiated). In another example, a period in which the first action is performed can at least partially overlap with a period in which the second action is performed.

It should also be noted that the news program schedule 300 has been greatly simplified for the purposes of providing an illustrative example of the disclosed system and method in connection with FIG. 3. In practice, a news program schedule is likely, although not required, to include a significant amount of data. For example, news program schedule entries may include additional attributes, including for example, an index or "page" number, an estimated duration, an actual duration, and/or an author, some or all of which may be used to generate signals and some or all of which may be used for other purposes, such as diagnostics, archiving, etc. Further, each news program schedule entry may include a script that causes certain NPS-related functions to be performed. However, for the sake of simplicity, the news program schedule 300 is illustrated in simplified form.

IV. Example Operations

Figure 4:
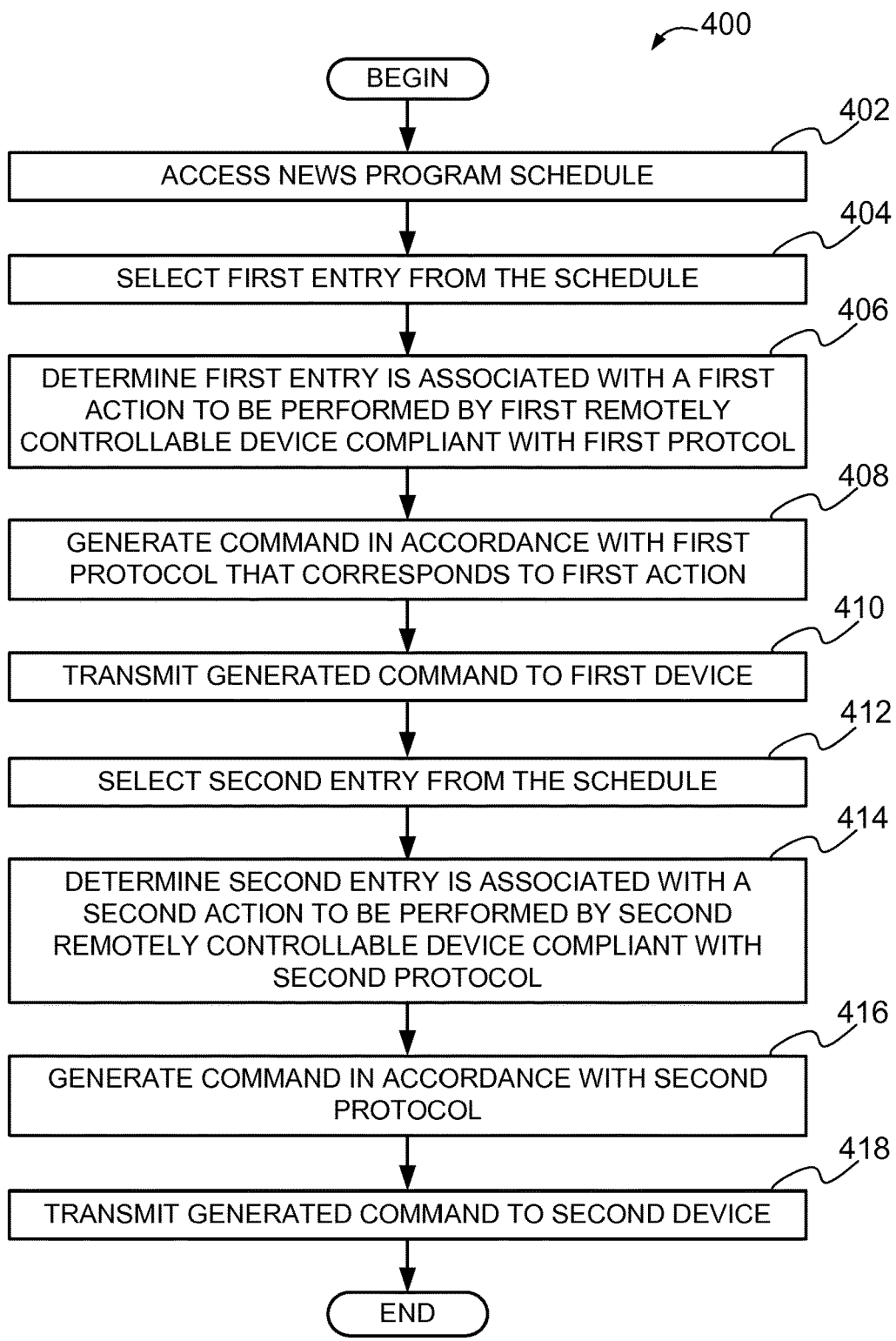
FIG. 4 is a flowchart of an example process that may be performed by the NPS described herein.

FIG. 4 is a flowchart of an example process 400 that may be performed by the NPS described herein. For example, the process 400 may be performed by NPS 100 described above in connection with FIG. 1A. The NPS may include a first remotely controllable device configured to receive commands formatted according to a first communication protocol. The NPS can also include a second remotely controllable device configured to receive commands formatted according a second communication protocol different from the first communication protocol.

At block 402, the method may involve accessing a news program schedule that includes entries indicative of a sequence of events to be carried out by the NPS. For example, a computing system associated with a scheduling system for the NPS can access the news program schedule file and begin reading its contents. At block 404, the method may involve selecting a first entry from the news program schedule. At block 406, the method may involve making a first determination that the first entry is associated with a first action to be performed by the first remotely controllable device. For example, the first entry can be analyzed by the scheduling system and/or the first remotely controllable device. Alone or in combination with other devices, the scheduling system can identify attributes in the first entry and, based on the presence and/or values of the identified attributes, determine that the first entry specifies the first device and a first action to be performed by that device, which action may also be specified by attributes in the first entry.

At block 408, the method may involve generating a command in accordance with a first communication protocol that corresponds to the first action. For example, the scheduling system may generate data formatted according to the first communication protocol. The generated command can be configured to cause the first device to perform the first action upon the first device receiving the generated command. At block 410, the generated command can be transmitted to the first device. Upon receiving the generated command, the first device can perform the first action. Thus, transmitting the generate command can cause the first device to perform the first action.

At block 412, the method may involve selecting a second entry from the news program schedule. At block 414 the method may involve making a second determination that the second entry is associated with a second action to be performed by the second remotely controllable device. For example, the second entry can be analyzed by the scheduling system and/or the second remotely controllable device. Alone or in combination with other devices, the scheduling system can identify attributes in the second entry and, based on the presence and/or values of the identified attributes, determine that the second entry specifies the second device and a second action to be performed by that device, which action may also be specified by attributes in the second entry.

At block 416, the method may involve generating a command in accordance with a second communication protocol that corresponds to the second action. For example, the scheduling system may generate data formatted according to the second communication protocol. The generated command can be configured to cause the second device to perform the second action upon the first device receiving the generated command. At block 418, the generated command can be transmitted to the second device. Upon receiving the generated command, the second device can perform the second action. Thus, transmitting the generate command can cause the second device to perform the second action.

The generation of the commands in blocks 408 and 416 may involve the use of a protocol translation module. Such a protocol translation module may select a device-specific subroutine corresponding to the first device or second device, and use the selected subroutine to generate the command signal.

In some examples, one or more blocks of the process 400 may be performed in response to receiving a timing signal based on a user input. For example, the process 400 may further include prompting a user for an input. A user interface may be used to prompt a user to initiate the performance of the first action by the first device (or the second action by the second device) by providing a user input to be used as a timing signal. The process 400 may also involve receiving a timing signal based on a user input. For instance, the user may press a button or the like, and the timing of the button press may be used to generate a timing signal or initiation signal to the first device, the second device, and/or other devices in the NPS involved in performing the actions specified by one or more entries of the news program schedule.

V. Example Variations

While one or more functions have been described as being performed by certain devices or entities (e.g., the scheduling system 110), the functions may be performed by any device or entity, such as those included in the NPS 100 described above.

In some embodiments, a given news program schedule entry may specify a single action to be performed by the NPS. In other embodiments, a given entry may specify multiple actions to be performed and such actions may be performed sequentially, simultaneously, or in another manner as specified by the entry. Thus, some embodiments may include using a single entry to facilitate both rendering of content on the video display and using captured video from the camera to generate a video output stream from the production switcher, rather than using separate entries for each as described in connection with FIG. 3. Moreover, some embodiments may include using multiple entries to facilitate performance of action(s) described as associated with a single entry herein.

In addition, while examples of the disclosed system have been described in connection with an NPS in which some devices communicate according to the MOS protocol (i.e., MOS-compliant devices) and some devices do not communicate according the MOS protocol (i.e., the non-MOS-compliant devices), examples may be implemented in which neither protocol is the MOS protocol. For instance, some devices may communicate according to a first protocol, and some devices may communicate with a second protocol that is different from the first protocol. The NPS can function to generate and transmit suitable commands to the different devices compliant with their respective communication protocols.

Further, while examples of the disclosed method have been described in connection with an NPS, examples of the method may be implemented in other environments.

Also, the functions need not be performed in the disclosed order, although in some examples, an order may be preferred. And not all functions need to be performed to achieve the desired advantages of the disclosed system and method, and therefore not all functions are required.

It should also be noted that the variations described in connection with select examples of the disclosed system and method may be applied to all other examples of the disclosed system or method.

Further, while select examples of the disclosed system and method have been described, alterations and permutations of these examples will be apparent to those of ordinary skill in the art. Other changes, substitutions, and alterations are also possible without departing from the disclosed system and method in its broader aspects as set forth in the following claims.

What is claimed is:

1. A news production system (NPS) comprising:
    a first remotely controllable device configured to perform an action from a first set of actions in response to receiving a corresponding command from a first set of commands, wherein the first set of commands are formatted according to a first protocol;
    a second remotely controllable device configured to perform an action from a second set of actions in response to receiving a corresponding command from a second set of commands, wherein the second set of commands are formatted according to a second protocol different from the first protocol; and a scheduling system configured for: (i) accessing a news program schedule including entries indicative of a sequence of events to be carried out using the NPS, (ii) selecting a first entry from the accessed news program schedule, (iii) making a first determination that the selected first entry is associated with a first action to be performed by the first remotely controllable device, (iv) responsive to making the first determination, generating a first command that is in accordance with the first protocol and that corresponds to the first action, (v) transmitting the generated first command to the first remotely controllable device and thereby causing the first remotely controllable device to perform the first action, (vi) selecting a second entry from the accessed news program schedule, (vii) making a second determination that the selected second entry is associated with a second action to be performed by the second remotely controllable device, (viii) responsive to making the second determination, generating a second command that is in accordance with the second protocol and that corresponds to the second action, and (ix) transmitting the generated second command to the second remotely controllable device and thereby causing the second remotely controllable device to perform the second action.

2. The NPS of claim 1, wherein the first protocol is a media object server (MOS) protocol, and wherein exactly one of the first and second remotely controllable devices is a MOS-compliant device.

3. The NPS of claim 1, wherein the second protocol involves messages formatted via an internet protocol channel.

4. The NPS of claim 1, wherein the scheduling system generating the second command comprises the scheduling system: (i) determining an attribute of the second entry, and (ii) using the determined attribute as a basis to select a subroutine that generates the second command.

5. The NPS of claim 1, wherein the second device comprises one device from a group of devices comprising a louver system, a motor, a projector, and a lighting system.

6. The NPS of claim 1, further comprising:

a status panel comprising a user interface configured for displaying an indication of a current status of the first remotely controllable device and displaying an indication of a current status of the second remotely controllable device, wherein the displayed indications are based on data received from the first and second remotely controllable devices, and wherein the data is formatted according to the first and second protocols, respectively.

7. The NPS of claim 1, wherein the news program schedule further includes a sequence of entries corresponding to events which combine to cause a news set associated with the NPS to transition from a first configuration to a second configuration, and wherein the transition involves actions performed by both the first remotely controllable device and the second remotely controllable device.

8. A method for use in a news production system (NPS) comprising: (i) a first remotely controllable device configured to perform an action from a first set of actions in response to receiving a corresponding command from a first set of commands, wherein the first set of commands are formatted according to a first protocol, (ii) a second remotely controllable device configured to perform an action from a second set of actions in response to receiving a corresponding command from a second set of commands, wherein the second set of commands are formatted according to a second protocol different from the first protocol, and (iii) a scheduling system, the method comprising:

accessing, via the scheduling system, a news program schedule including entries indicative of a sequence of events to be carried out using the NPS;

selecting a first entry from the accessed news program schedule;

making a first determination that the selected first entry is associated with a first action to be performed by the first remotely controllable device;

responsive to making the first determination, generating a first command that is in accordance with the first protocol and that corresponds to the first action;

transmitting the generated first command to the first remotely controllable device and thereby causing the first remotely controllable device to perform the first action;

selecting a second entry from the accessed news program schedule;

making a second determination that the selected second entry is associated with a second action to be performed by the second remotely controllable device;

responsive to making the second determination, generating a second command that is in accordance with the second protocol and that corresponds to the second action; and transmitting the generated second command to the second remotely controllable device and thereby causing the second remotely controllable device to perform the second action.

9. The method of claim 8, wherein the first protocol is a media object server (MOS) protocol, and wherein exactly one of the first and second remotely controllable devices is a MOS-compliant device.

10. The method of claim 8, wherein the second protocol involves messages formatted via an internet protocol channel.

11. The method of claim 8, wherein generating the second command comprises: (i) determining an attribute of the second entry, and (ii) using the determined attribute as a basis to select a subroutine that generates the second command.

12. The method of claim 8, wherein the second device comprises one device from a group of devices comprising a louver system, a motor, a projector, and a lighting system.

13. The method of claim 8, further comprising causing the first and second devices to perform the first and second actions, respectively, contemporaneously.

14. The method of claim 8, wherein the news program schedule further includes a sequence of entries corresponding to events which combine to cause a news set to transition from a first configuration to a second configuration, and wherein the transition involves actions performed by both the first remotely controllable device and the second remotely controllable device.

15. A non-transitory computer-readable medium storing instructions that, when executed by one or more processors of a computing system associated with a news production system (NPS) comprising: (i) a first remotely controllable device configured to perform an action from a first set of actions in response to receiving a corresponding command from a first set of commands, wherein the first set of commands are formatted according to a first protocol, (ii) a second remotely controllable device configured to perform an action from a second set of actions in response to receiving a corresponding command from a second set of commands, wherein the second set of commands are formatted according to a second protocol different from the first protocol, cause performance of operations comprising:

accessing a news program schedule including entries indicative of a sequence of events to be carried out using the NPS;

selecting a first entry from the accessed news program schedule;

making a first determination that the selected first entry is associated with a first action to be performed by the first remotely controllable device;

responsive to making the first determination, generating a first command that is in accordance with the first protocol and that corresponds to the first action;

transmitting the generated first command to the first remotely controllable device and thereby causing the first remotely controllable device to perform the first action;

selecting a second entry from the accessed news program schedule;

making a second determination that the selected second entry is associated with a second action to be performed by the second remotely controllable device;

responsive to making the second determination, generating a second command that is in accordance with the second protocol and that corresponds to the second action; and transmitting the generated second command to the second remotely controllable device and thereby causing the second remotely controllable device to perform the second action.

16. The non-transitory computer-readable medium of claim 15, wherein the first protocol is a media object server (MOS) protocol, and wherein exactly one of the first and second remotely controllable devices is a MOS-compliant device.

17. The non-transitory computer-readable medium of claim 15, wherein the second protocol involves messages formatted via an internet protocol channel.

18. The non-transitory computer-readable medium of claim 15, wherein generating the second command comprises: (i) determining an attribute of the second entry, and (ii) using the determined attribute as a basis to select a subroutine that generates the second command.

19. The non-transitory computer-readable medium of claim 15, wherein the second device comprises one device from a group of devices comprising a louver system, a motor, a projector, and a lighting system.

20. The non-transitory computer-readable medium of claim 15, wherein the news program schedule further includes a sequence of entries corresponding to events which combine to cause a news set to transition from a first configuration to a second configuration, and wherein the transition involves actions performed by both the first remotely controllable device and the second remotely controllable device.

* * * * *